Figure 1:
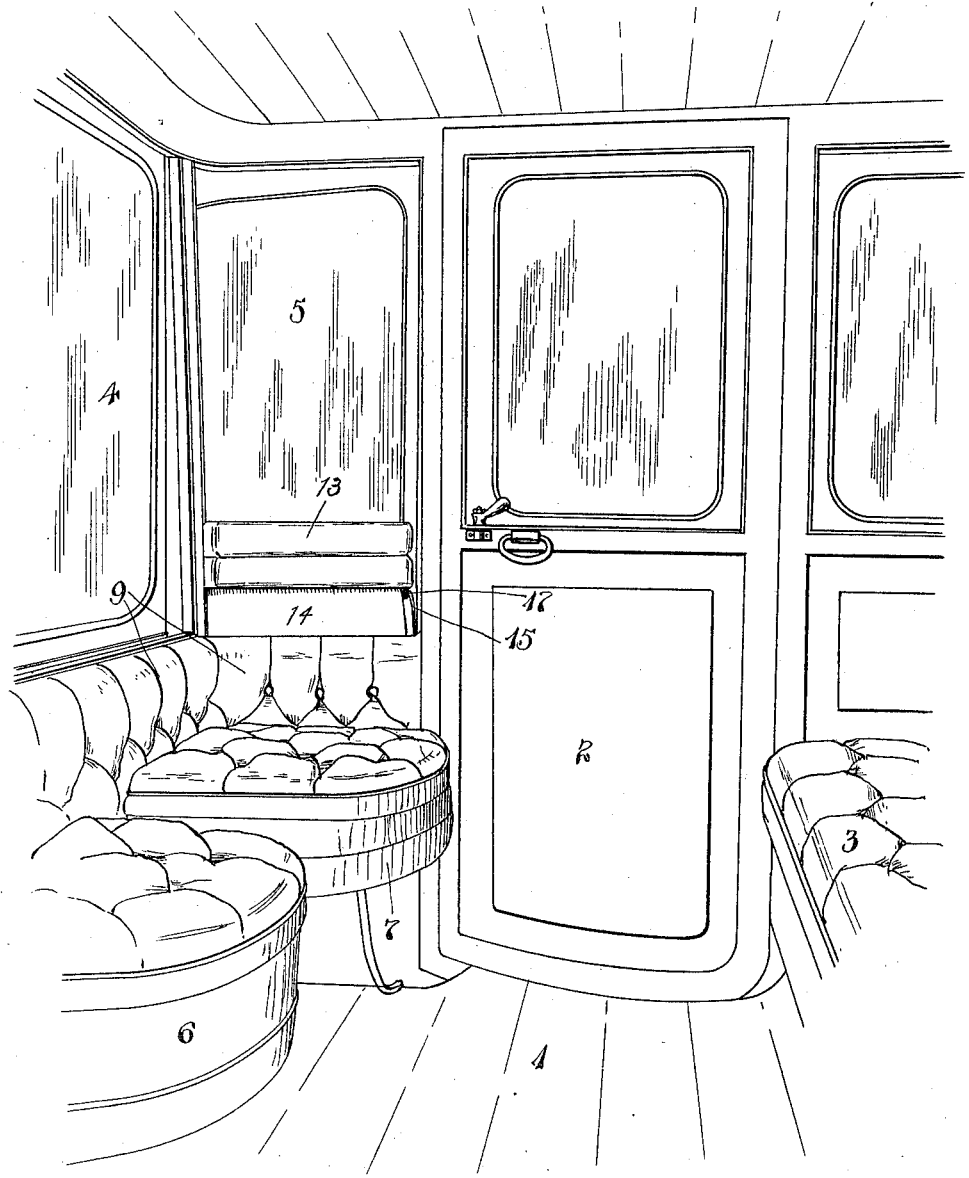

F. A. BRAND.
VEHICLE BODY.
APPLICATION FILED FEB. 15, 1912.

1,036,790.

Patented Aug. 27, 1912.
2 SHEETS—SHEET 1.

WITNESSES
Oliver M. Kappler
Robert M. See

INVENTOR
Frederick A. Brand
BY J. B. Fay
ATTORNEY

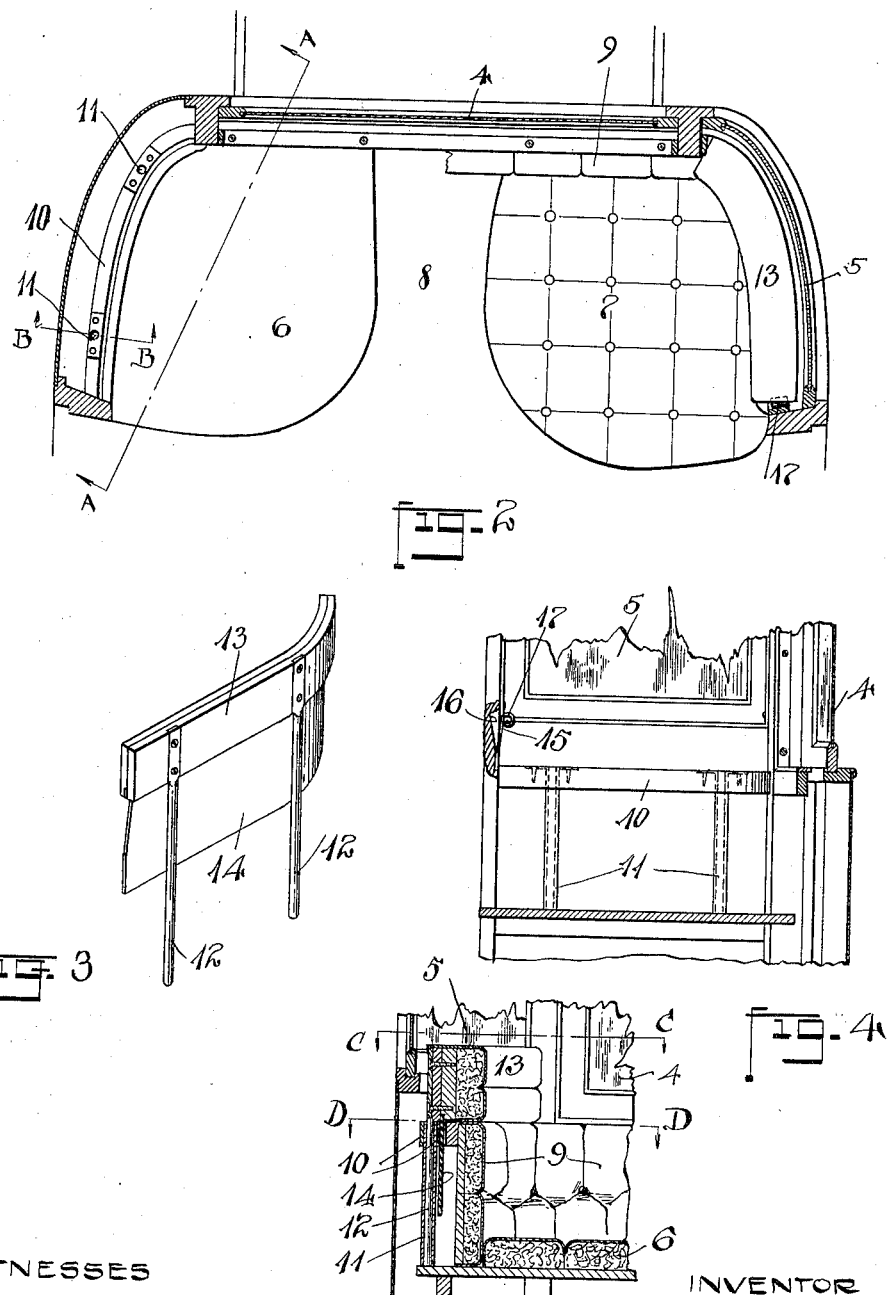

UNITED STATES PATENT OFFICE.

FREDERICK A. BRAND, OF CLEVELAND, OHIO, ASSIGNOR TO THE BROC ELECTRIC VEHICLE COMPANY, OF CLEVELAND, OHIO, A CORPORATION OF OHIO.

VEHICLE-BODY.

1,036,790.      Specification of Letters Patent.     Patented Aug. 27, 1912.

Application filed February 15, 1912. Serial No. 677,804.

*To all whom it may concern:*

Be it known that I, FREDERICK A. BRAND, a citizen of the United States, and a resident of Cleveland, county of Cuyahoga, and State of Ohio, have invented a new and useful Improvement in Vehicle-Bodies, of which the following is a specification, the principle of the invention being herein explained and the best mode in which I have contemplated applying that principle, so as to distinguish it from other inventions.

The present invention relates generally to vehicle bodies, and its particular object is the provision of an improved coupé body for electric automobiles.

In electric automobiles designed to carry four persons, it is desirable that the operator be seated at one side of the rear seat, and in addition to the person sitting beside the operator, the third and fourth persons must be seated in front of the operator. In the prevailing type of body a rearwardly facing seat is disposed at the front of the body and it extends entirely across the body, consequently the two persons occupying the front seat are forced to face squarely to the rear and they necessarily obscure the operator's vision of the road. Furthermore, in the nature of things, the persons seated on the front seat will often desire to look ahead of the car, as for instance when the operator suddenly stops or operates his warning signal, but in such cases such persons must twist around in order to ascertain what has caused the operator to stop or signal.

The present invention provides a body which has overcome these difficulties.

To the accomplishment of these and related ends said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—Figure 1 is a perspective view of the interior of the body, one side being broken away, the two sides of the body being identical except for the provision of operating mechanism at one side; Fig. 2 is a horizontal section of the front part of the body, the section of the respective sides being taken on different planes; Fig. 3 is a perspective view of a lazyback; Fig. 4 is a broken section on the line A—A in Fig. 2, certain parts being removed; and Fig. 5 is a broken section on the line B—B in Fig. 2 with the parts assembled, the line C—C indicating the plane of the section of the right side of Fig. 2, and the line D—D indicating the plane of the section of the left side.

The improved body comprises generally a compartment 1 provided at substantially the center of its opposite sides with entrances closable by means of doors 2, while a seat 3 extends entirely across the body just rearwardly of the entrances. The front wall of the body includes a window 4 which extends substantially from side to side of the body, while windows 5 extend from the respective entrances substantially to the sides of the window 4, the windows 5 being curved into the plane of the window 4. Forwardly of the entrances are disposed two seats 6 and 7 which are rigidly secured in position against the front and respective sides of the body, but the seats 6 and 7 have a very considerable space 8 between them. A fixed back 9 extends across the front and sides of the body so that it forms a substantially right angled back for each of the seats 6 and 7.

Behind the respective side portions of the fixed back 9 is secured a bar 10 from which depend a plurality of guide tubes 11. Slidable in the guide tubes 11 are corresponding rods 12 to the upper ends of which is secured a back which provides, in the assembled condition of parts, a movable back for the seats 6 and 7. The movable back comprises a portion 13 which is directly secured to the rods 12, and a portion 14 depending from the part 13.

In assembling the parts the guide rods are directed into the tubes 11 so that the movable back may slide freely up and down. The guide tubes themselves are concealed behind the fixed back 9 and in the lower position of the movable back the part 13 rests on the top of the fixed back 9, and the front surface of its upholstering is flush with the front surface of the upholstering of the fixed back 9. The depending part 14 of the movable back will be ornamentally covered, but preferably not upholstered, and in the lower position of the back it is concealed behind the fixed back 9. In order to maintain the movable back in raised position a spring 15 is secured adjacent a recess 16 in the body frame, and it is provided with a head 17 adapted when the back is raised to be sprung out under the part 13. At the right side of Fig. 2 the movable back is shown in raised position, the unupholstered back designed for this side of the body being illustrated in Fig. 3. At the left side of Fig. 2 the back has been removed entirely, as it also has been in Fig. 4, but in Fig. 5 the parts have been completely assembled.

In use if the front seats are not occupied the movable backs will be in lower position and the windows 5 extend downwardly substantially to the level of the tops of the movable backs when they are in such lower position. The operator of the car consequently has a view of the roadway unobstructed except by the necessary frame for supporting the front and side windows. When the seats 6 and 7 are to be occupied the occupants need not face directly to the rear, but they may face each other or they may face diagonally to the rear, or they may face directly to the rear. In either case, however, since substantially the entire front portion of the body is composed of windows, and since the seats 6 and 7 are transversely spaced from each other, the persons occupying the front seats will not obstruct the view of the operator of the car, the importance of which will be obvious. The occupants themselves will naturally sit almost facing each other, and consequently they may readily view the roadway in front of the car, or face the occupants of the rear seat, in either case with practically no twisting from one position to the other. The movable backs provide for the thorough comfort of the occupants of the front seats, for it is simply necessary to pull the back upwardly and the spring will spring forth to retain the back in raised position. When it is desired to lower the back again it is merely necessary to push the spring back until the head is free from engagement with the back, whereupon the back may be pushed down past the spring.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a coupé vehicle body having a window therein, the combination of a seat disposed below said window; a fixed back for said seat, said back extending to a point below the level of the window sill; and a vertically movable supplementary back adapted in its lower position to rest upon said fixed back and to extend therefrom to the level of the window sill.

2. In a vehicle body, the combination of a seat; a fixed back therefor; a plurality of guide tubes disposed behind said fixed back; a plurality of rods slidable in the respective tubes; a movable back secured to said rods, said movable back including a part adapted, when the back is in its lower position, to rest on said fixed back with its front surface flush with the front surface thereof, and a second part depending from the first part behind the fixed back; a window behind said seat, extending down substantially to the level of the top of the movable back when the latter is in lower position; and means for securing said movable back in raised position.

3. In a vehicle body, the combination of a seat; a fixed back therefor; a plurality of guide tubes disposed behind said fixed back; a plurality of rods slidable in the respective tubes; a movable back secured to said rods, said movable back including a part adapted, when the back is in its lower position, to rest on said fixed back with its front surface flush with the front surface thereof, and a second part depending from the first part behind the fixed back; a window behind said seat, extending down substantially to the level of the top of the movable back when the latter is in lower position; and a spring secured within a recess in the body, said spring having a head adapted to extend under the first part of the movable back when the latter is in raised position.

Signed by me, this 13th day of February, 1912.

FREDERICK A. BRAND.

Attested by—
ROBERT M. SEE,
D. T. DAVIES.

---

Copies of this patent may be obtained for five cents each, by addressing the "Commissioner of Patents, Washington, D. C."